W. F. BLEECKER.
PROCESS OF PRODUCING GRANULAR MATERIAL.
APPLICATION FILED JAN. 15, 1915.
1,175,224.  Patented Mar. 14, 1916.
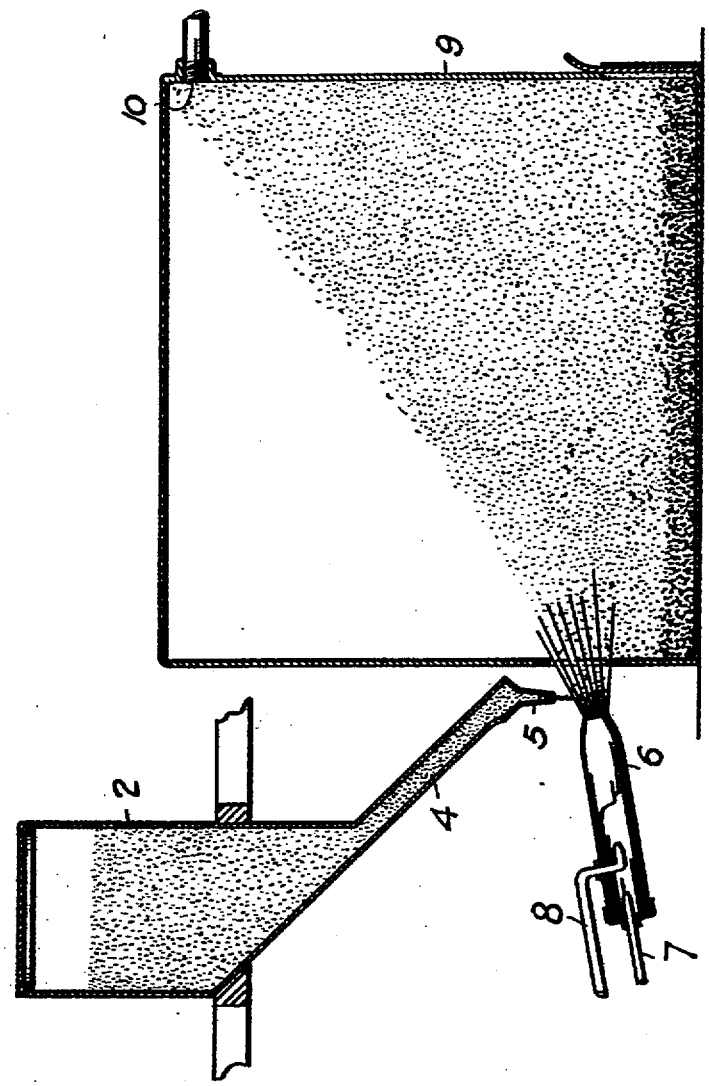

UNITED STATES PATENT OFFICE.

WARREN F. BLEECKER, OF CANONSBURG, PENNSYLVANIA.

PROCESS OF PRODUCING GRANULAR MATERIAL.

1,175,224.  Specification of Letters Patent.  Patented Mar. 14, 1916.

Application filed January 15, 1915. Serial No. 2,459.

*To all whom it may concern:*

Be it known that I, WARREN F. BLEECKER, a citizen of the United States, residing at Canonsburg, in the county of Washington and State of Pennsylvania, have invented certain new and useful Improvements in Processes of Producing Granular Material, of which the following is a specification.

This invention relates to a process of reducing a fusible substance, such as glass, to granules of substantially spherical form and uniform size, and it briefly consists in pulverizing the material and subjecting the pulverulent matter to the influence of heat while in motion, thereby causing the minute particles to fuse and assume a spherical shape.

The material is subsequently sized to the desired mesh and by coloring the material before it is pulverized, the granules may be produced in whatever color is desired.

While the product of my process is adapted for use for many different purposes, it is particularly suitable for coating photographic plates and films employed in the process of color photography commonly known as the autochrome process of Lumière.

The material of which the spherical granules are produced may be glass, silica, borax, or any other similar fusible substance, it being understood that if a colored granular product is required for photographic purposes the substance must be transparent as well as colorable.

Glass and more especially lead glass, is particularly adapted for use in my process by reason of its low melting point and its superior optical qualities, but if a colored product is desired the first step in the process is the coloring of the material which may be accomplished by any suitable method and with any suitable coloring agent such as oxids of metal commonly used in coloring glass.

The material is crushed in a raw, cold condition and then pulverized by any known system of fine grinding. An iron-lined ball mill with iron balls has been found to be well adapted for the purpose, provided that the dust produced by its action is prior to its formation in the spheres in the apparatus hereinafter to be described, treated with a diluting acid to remove the iron it collected in the grinding process.

The pulverous matter is sized to separate the coarser particles, by any suitable means as for example an air separator. The coarse particles are subsequently reground and added to the finer matter until the entire mass is of substantially uniform size. The divided matter is now transformed into granules of spherical form by subjecting it to heat while in motion which may be accomplished in many different ways of which the following method is an example.

Referring to the accompanying drawings which shows in vertical section an apparatus suitable for use in producing spherical granules, the reference character 2 designates a bin into which the pulverulent matter is fed. The bin has at its lower end an opening through which the material is discharged onto an inclined surface which delivers it into a spout 5. The spout discharges the dust in a fine stream which is intercepted by a jet of burning gas ejected from a burner 6 under a pressure of about twenty pounds per square inch. The burner may be of any suitable construction and it is connected with a pipe 7 for the introduction of air, and with a pipe 8 for the supply of a combustible gas. The heat and velocity of the gas jet cause the dust particles to fuse and assume a spherical shape and in this condition they are driven into a chamber 9 upon the floor of which the greater portion of the particles collect, while the lighter matter is drawn through an opening 10 in the upper portion of the chamber into a dust-collector by the action of a fan or other suitable suction device.

It will be understood that means not shown in the drawings must be provided to regulate the heat and velocity of the gas jet and the rate at which the dust is fed through the nozzle.

In case the contents of the chamber contains unfused particles, which failed to pass through its outlet 10, the entire mass may be again passed through the flame in the above described manner without affecting the particles already fused.

The mass of spherical granules collected in the chamber 9 may be sized by any suitable method to obtain a product of uniform diameter. When the product of the process is to be used as a coating for plates or films in the process of color photography hereinbefore referred to, the transparent material is before grinding divided into three groups which are separately treated to assume respectively a red, a blue, and a green color.

The three colored substances are separately pulverized and fused to granular spherical form as hereinabove described, and after having been sized to a uniform diameter are thoroughly mixed in equal quantities.

The finished product represents a trichromatic coating for photographic plates and films suitable for use in an autochrome process of photography and superior to the mixture of starch grains at present used, by reason of the spherical form, uniform size and greater transparency of its particles.

Having thus described my invention what I claim and desire to secure by Letters-Patent is:

1. The process of producing a coating-material for photographic plates for color-photography, consisting in subjecting a pulverulent, transparent and fusible substance in quantities of different colors, to melting heat while in motion, sizing the three products to a uniform diameter, and mixing the final products.

2. The herein described process of producing granular material consisting in subjecting a quantity of pulverulent fusible material synchronously to a disseminative or separative action and to heat of a melting temperature whereby to cause the particles of the material to become spherical by surface tension.

3. The herein described process of producing granular material consisting in subjecting a quantity of pulverulent fusible material to the disseminative or separative action of a blast heated to a melting temperature, whereby to cause the particles of the material to become spherical by surface tension.

4. The herein described process of producing granular material consisting in subjecting a quantity of pulverulent glass synchronously to a disseminative or separative action and to heat of a melting temperature whereby to cause the particles of the material to become spherical by surface tension.

5. The herein described process of producing granular material consisting in subjecting a quantity of pulverulent fusible material of uniform composition synchronously to a disseminative or separative action and to heat of a melting temperature whereby to cause the particles of the material to become spherical by surface tension.

6. The herein described process of producing granular material consisting in pulverizing a fusible substance to a substantially uniform size, and subjecting a quantity of the pulverulent material synchronously to a disseminative or separative action and to heat of a melting temperature whereby to cause the particles of the material to become spherical by surface tension.

7. The herein described process of producing granular material consisting in first coloring a fusible substance, then pulverizing the colored substance to a substantially uniform size, and finally subjecting a quantity of the pulverulent material synchronously to a disseminative or separative action and to heat of a melting temperature whereby to cause the particles of the material to become spherical by surface tension.

In testimony whereof I have affixed my signature in presence of two witnesses.

WARREN F. BLEECKER.

Witnesses:
CLYDE M. FOSTER,
WM. Y. BLEAKLEY.

Copies of this patent may be obtained for five cents each, by addressing the "Commissioner of Patents, Washington, D. C."